United States Patent
Crosby et al.

(10) Patent No.: US 10,063,087 B2
(45) Date of Patent: Aug. 28, 2018

(54) AUTOMATIC TUNING OF RESONANCE-BASED WIRELESS CHARGING RECEIVER

(71) Applicant: NXP B.V., Eindhoven (NL)

(72) Inventors: Robert Glenn Il Crosby, Livermore, CA (US); Peter Christiaans, Mountain View, CA (US); Qiong Wu, San Jose, CA (US)

(73) Assignee: NXP B.V., Eindhoven (NL)

( * ) Notice: Subject to any disclaimer, the term of this patent is extended or adjusted under 35 U.S.C. 154(b) by 200 days.

(21) Appl. No.: 15/138,322

(22) Filed: Apr. 26, 2016

(65) Prior Publication Data
US 2017/0310145 A1   Oct. 26, 2017

(51) Int. Cl.
| H02J 7/00 | (2006.01) |
| H02J 7/02 | (2016.01) |
| H02J 50/12 | (2016.01) |

(52) U.S. Cl.
CPC .............. *H02J 7/025* (2013.01); *H02J 50/12* (2016.02)

(58) Field of Classification Search
USPC ........................................................ 320/108
See application file for complete search history.

(56) References Cited

U.S. PATENT DOCUMENTS

| 2010/0117593 A1* | 5/2010 | Piccard ............... B60L 11/1864 320/104 |
| 2011/0193417 A1 | 8/2011 | Hirasaka et al. |
| 2013/0049482 A1* | 2/2013 | Rofe ....................... H02J 50/12 307/104 |
| 2015/0076920 A1 | 3/2015 | Zargham et al. |
| 2016/0141883 A1* | 5/2016 | Kanno ..................... H03J 3/20 307/104 |

FOREIGN PATENT DOCUMENTS

| EP | 0829940 A2 | 3/1998 |
| WO | 2011036659 A2 | 3/2011 |
| WO | 2015005106 A1 | 1/2015 |

OTHER PUBLICATIONS

Gebhart, Michael et al.: "Automated Antenna Impedance Adjustment for Near Field Communication (NFC)", 12th International Conference on Telecommunications—ConTEL 2013, Zagreb, Croatia, Jun. 26-28, 2013, pp. 235-242.

(Continued)

*Primary Examiner* — Samuel Berhanu
(74) *Attorney, Agent, or Firm* — Daniel D. Hill

(57) ABSTRACT

A wireless charging receiver operates on a resonance principle and includes an impedance matching circuit coupled between an antenna and a rectifier circuit. The impedance matching circuit has both series-connected and parallel-connected capacitors. At least one of the capacitors is a tunable variable capacitor. A method is provided for automatically adjusting a capacitance value of the at least one variable capacitor based on an error voltage between a target rectifier voltage and a measured rectifier voltage. Automatically adjusting the antenna impedance of the receiver provides for improved power transfer efficiency for changing operating conditions. In one embodiment, one or more of the parallel-connected capacitors are variable capacitors. In another embodiment, one or more of the series-connected capacitors are variable capacitors.

20 Claims, 3 Drawing Sheets

(56) References Cited

OTHER PUBLICATIONS

Roland, Michael et al.: "Automatic Impedance Matching for 13.56 MHz NFC Antennas", IEEE, Communication Systems, Networks and Digital Signal Processing, 2008, CNSDSP 2008. 6th International Symposium, Jul. 25, 2008, pp. 288-291.
muRata: "Variable Capacitor LXRW19V Series", Document No. LX-1-1246 Rev1.0, pp. 1-16.

* cited by examiner

AUTOMATIC TUNING OF RESONANCE-BASED WIRELESS CHARGING RECEIVER

BACKGROUND

Field

This disclosure relates generally to wireless power transfer and more specifically to a method and apparatus for automatically tuning a resonance-based wireless charging receiver.

Related Art

Wireless charging and transfer technology has been developed to enable the efficient transistor of power to devices such as mobile phones and tablet PCs without the use of wires. The alliance for Wireless Power (A4WP) is a standards body set up to help enable the efficient transfer of power wirelessly. A typical wireless charging receiver includes a series-parallel resonator connected to a rectifier circuit. Typically, an inductor loop in each of the transmitter and the receiver functions as an antenna for the power transfer. The electrical coupling efficiency for a particular transmitter/receiver antenna combination varies both spatially and by operating conditions. Correspondingly, the power transfer is highly affected by the operating conditions, including rectifier voltage, power to the rectifier, and by the orientation and distance between the receiver and transmitter inductor loop antennas. The problem is compounded for relatively small antennas.

Therefore, a need exists for a method that provides efficient wireless power transfer for varying operating conditions.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
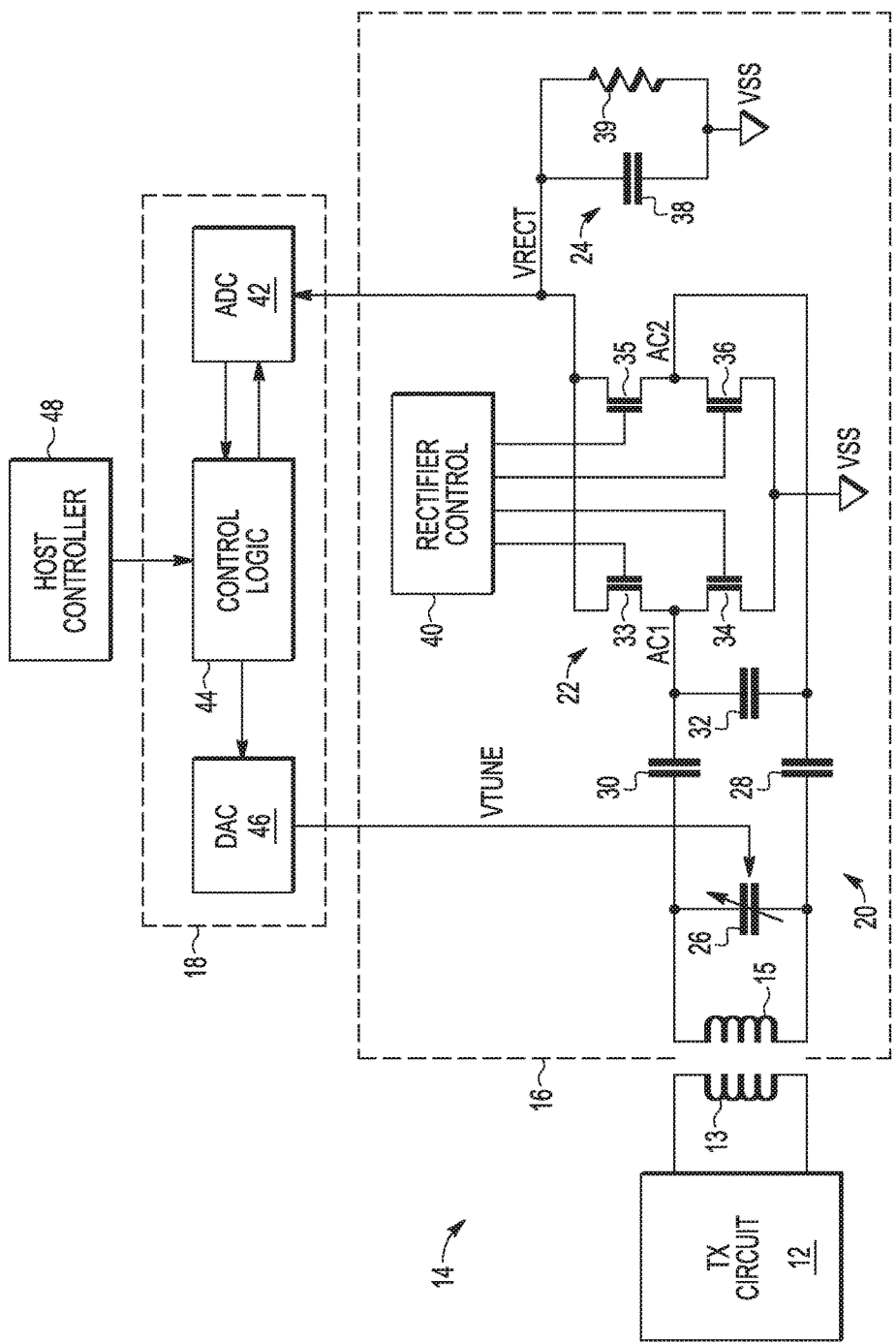
FIG. 1 illustrates, in block diagram form, a wireless charging system in accordance with an embodiment.

Generally, there is provided, an apparatus and method for automatically tuning the antenna impedance of a wireless charging receiver in a wireless charging system. The wireless charging system may be used, for example, to charge a battery in a portable handheld device. The apparatus includes a resonator network coupled between an antenna and a rectifier circuit. The resonator network has both series-connected and normally also has parallel-connected capacitors. At least one of the capacitors is a tunable variable capacitor. A capacitance value of the at least one variable capacitor is automatically adjusted based on an error voltage between a target rectifier voltage and a measured rectifier voltage. Automatically adjusting the resonator network impedance of the receiver provides the best power transfer for changing operating conditions. In one embodiment, one or more of the parallel-connected capacitors are variable capacitors. In another embodiment, one or more of the series-connected capacitors are variable capacitors.

In one embodiment, there is provided, a method for adjusting an antenna resonance impedance network of a wireless charging receiver during a wireless charging operation, the wireless charging receiver being inductively coupled to a wireless charging transmitter, the method comprising: measuring an output voltage of a voltage rectifier, the voltage rectifier coupled to the antenna resonance impedance network; determining whether or not the output voltage is between upper and lower limits; if the output voltage is not between the upper and lower limits, determining an error voltage based on the output voltage and a target output voltage; changing a capacitance of a variable capacitive element in the antenna resonance impedance network; and determining if there is an improvement in the error voltage. Changing the capacitance of the variable capacitive element may further comprise changing a tuning voltage from a digital-to-analog converter to the variable capacitive element based on the error voltage. Measuring the output voltage may further comprise providing the output voltage to an analog-to-digital converter. If the output voltage is between the upper and lower limits, determining that an impedance of the antenna resonance impedance network is matched to an impedance of the wireless charging transmitter. Determining the error voltage may further comprise calculating a difference between the output voltage of the voltage rectifier and the target rectifier voltage. The method may further comprise converting the error voltage to a plurality of bits for being provided to a digital-to-analog converter, the digital-to-analog converter coupled to the variable capacitive element. Measuring the output voltage of the voltage rectifier may further comprise measuring an output voltage of a MOSFET bridge rectifier. Changing the capacitance of the variable capacitive element may further comprise changing a tuning voltage from a digital-to-analog converter to the variable capacitive element using a host controller. Determining the error voltage based on the output voltage and the target output voltage may further comprise determining the error voltage based on a magnitude of a difference between the output voltage and the target output voltage.

In another embodiment, there is provided, a method in a wireless charging receiver having an antenna coupled to an input of a resonance network, the resonance network having an output coupled to a rectifier circuit, and the resonance network including an adjustable impedance element, the method comprising: storing a target rectifier voltage; measuring a first output voltage of rectifier circuit; determining if the first output voltage of the rectifier circuit is within an upper limit and a lower limit; if the first output voltage is not within the upper and lower limits, calculating a first error voltage as a difference between the first output voltage and the target rectifier voltage; changing the impedance of the adjustable impedance element by a first set amount; measuring a second output voltage of the rectifier circuit; calculating a second error voltage as a difference between the second output voltage and the target rectifier voltage; determining if the second error voltage is lower than the first error voltage; changing the first set amount to a second set amount based on determining if the second error voltage is lower than the first error voltage; and changing the impedance of the adjustable impedance element by the second set amount. The method may further comprise: updating the target rectifier voltage; measuring a third output voltage of the rectifier circuit; and determining if the third output voltage is between the upper and lower limits. The method may further comprise updating the target rectifier voltage using a host controller. Calculating the first error voltage as a difference between the first output voltage and the target rectifier voltage may further comprise calculating the first error voltage as a magnitude of the different between the first output voltage and the target rectifier voltage. Changing the impedance of the adjustable impedance element by a first set amount may further comprise using a digital-to-analog converter to control the adjustable impedance element and wherein the first set amount comprises a least significant bit of the first error voltage. Measuring a first output voltage of rectifier circuit may further comprise using an analog-to-digital converter to receive the first output voltage from the rectifier circuit.

In yet another embodiment, there is provided, a wireless charging receiver comprising: an antenna; a resonance network having an input coupled to the antenna, and an output, the resonance network having an impedance matching circuit comprising a variable impedance element; a rectifier circuit having an input coupled to the output of the impedance matching circuit, and an output for providing a rectifier output voltage; an analog-to-digital converter having an input coupled to receive the rectifier output voltage, and an output; control logic having an input coupled to the output of the analog-to-digital, and an output; and a digital-to-analog converter having an input coupled to the output of the control logic, and an output coupled to provide a tuning voltage to the variable impedance element. The variable impedance element may be a variable capacitor. The impedance matching circuit may comprise: a first capacitor having a first terminal coupled to a first terminal of the antenna, and a second terminal; a second capacitor having a first terminal coupled to a second terminal of the antennal, and a second terminal; a third capacitor having a first terminal coupled to the second terminal of the first capacitor, and a second terminal, and a second terminal coupled to the second terminal of the second capacitor; and the variable impedance element has a first terminal coupled to the first terminal of the antenna, a second terminal coupled to the second terminal of the antenna, and a control terminal coupled to the output of the digital-to-analog converter. The rectifier circuit may be a MOSFET bridge rectifier, or one or more of the MOSFET transistors may be replaced with Schottky diodes. The wireless charging receiver may further comprise a host controller coupled to the control logic.

FIG. 1 illustrates, in block diagram form, a wireless charging system 10 in accordance with an embodiment. Wireless charging system 10 includes wireless charging transmitter circuit 12, wireless charging receiver 14, and host controller 48. Wireless charging transmitter circuit 12 is connected to an inductor loop antenna 13. Wireless charging receiver 14 includes resonance network 16 and control circuit 18. Resonance network 16 includes inductor loop antenna 15, rectifier circuit 22, RC circuit 24, and rectifier logic 40. Impedance matching circuit 20 includes variable capacitor 26 and capacitors 28, 30, and 32. Rectifier circuit 22 is a MOSFET bridge rectifier circuit having MOSFET transistors 33, 34, 35, and 36. RC (resistance-capacitance) circuit 24 includes capacitor 38 and resistor 39. At least a portion of the resistance of resistor 39 represents the electrical load of the rectifier. Control circuit 18 includes analog-to-digital converter (ADC) 42, control logic 44, and digital-to-analog converter (DAC) 46. Control circuit 18 may be implemented as one or more integrated circuits. Alternately, other portions of wireless charging receiver 14 can be integrated with control circuit 18, such as rectifier circuit 22 and rectifier logic 40.

In wireless charging receiver 14, antenna 15 has a first terminal connected to a first terminal of variable capacitor 26, and a second terminal connected to a second terminal of variable capacitor 26. Variable capacitor 26 has a control terminal for receiving a control signal labeled "VTUNE". Capacitor 28 has a first terminal connected to the second terminal of antenna 15, and a second terminal. Capacitor 30 has a first terminal connected to the first terminal of antenna 15. Capacitor 32 has a first terminal connected to the second terminal capacitor 30, and a second terminal connected to the second terminal of capacitor 28.

In rectifier circuit 22, N-channel transistor 33 has a first current electrode for providing a rectifier output voltage labeled "VRECT", a control electrode, and a second current electrode coupled to the second terminal of capacitor 30 for receiving a voltage labeled "AC1". N-channel transistor 34 has a first current electrode connected to the second current electrode of N-channel transistor 33, a control electrode, and a second current electrode connected to a power supply voltage terminal labeled "VSS". In the illustrated embodiment, VSS is connected to ground, or zero volts. N-channel transistor 35 has a first current electrode connected to the first current electrode of N-channel transistor 33, a control electrode, and a second current electrode connected to the second terminal of capacitor 28 for receiving a voltage labeled "AC2". Voltages AC1 and AC2 together are differential voltages. In another embodiment, one or more of the MOSFET transistors may be replaced with Schottky diodes.

In RC circuit 24, capacitor 38 has a first terminal connected to the first current electrodes of N-channel transistors 33 and 35, and a second terminal connected to power supply voltage terminal VSS. Resistor 39 has a first terminal connected to the first terminal of capacitor 38, and a second terminal connected to the second terminal of capacitor 38. RC circuit 24 provides stability to rectifier voltage VRECT. Resistor 39 represents the electrical load of rectifier 22.

In control circuit 18, ADC 42 has a first input connected to the first current electrodes of N-channel transistors 33 and 35 of rectifier circuit 22, and an output and a second input. Control logic 44 has a first output connected to the second input of ADC 42, a second output, a first input connected to the output of ADC 42, and a second input connected to an output of host controller 48. Digital-to-analog converter 46 has an output connected to the second output of control logic 44, and an output for providing control signal VTUNE to the control terminal of variable capacitor 26.

In operation, loop antenna 15 is placed in proximity to antenna 13. An alternating electrical current in loop antenna 13 from transmitter circuit 12 causes an alternating electrical current in loop antenna 15. Power is transferred from antenna 12 to antenna 15 according to conventional electromagnetic theory. The power transfer is highly affected by the operating conditions, including rectifier voltage, power to the rectifier, and by the orientation and distance between the transmitter and receiver inductor loop antennas 13 and 15, respectively. Depending on the size and shape of loop antennas 13 and 15, the power transfer can be very sensitive to the positioning of receiver antenna 15 to transmitter antenna 13. To aid in making power transfer between transmitter 12 and receiver 14 more efficient, resonance network 16 includes a variable capacitor in impedance matching circuit 20. A capacitance of variable capacitor 26 is adjusted to control rectifier voltage VRECT to be equal to, or as near as possible, a target rectifier voltage (VTAR). Note that impedance matching circuit 20 is just one embodiment of an impedance matching circuit. Also, other elements of the impedance matching circuit may be adjusted to accomplish the same or similar result. For example, in other embodiments, one or more of inductors, capacitors, or resistors may be adjustable in a manner similar to that described herein. A method for adjusting the capacitance of variable capacitor 26 will described with reference to both FIG. 1 and FIG. 2.

Figure 2:
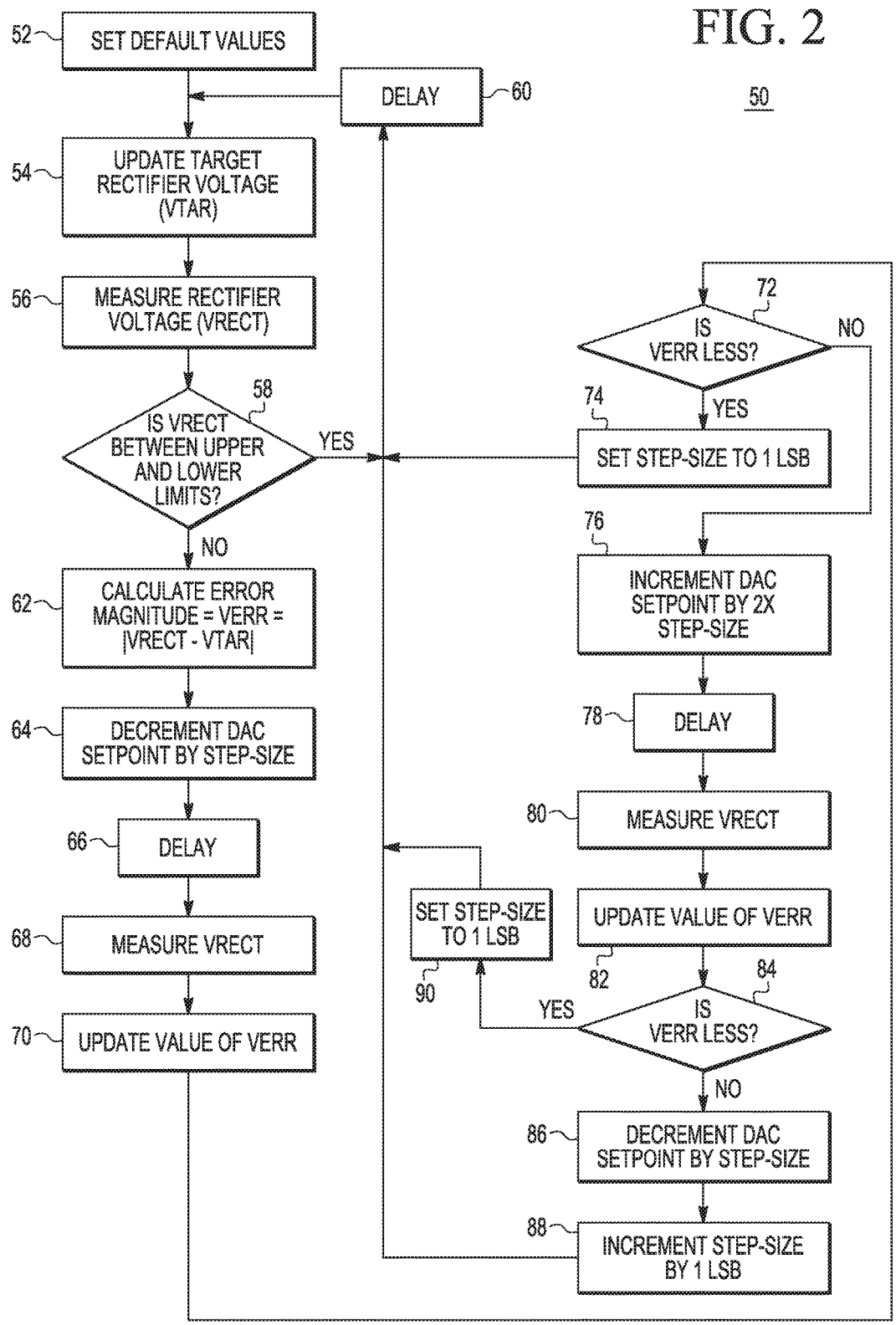
FIG. 2 illustrates a flowchart of a method for automatically adjusting the receiver antenna impedance in the wireless charging system of FIG. 1.

FIG. 2 illustrates a flowchart of method 50 for automatically adjusting the receiver antenna impedance in wireless charging system 10 of FIG. 1. At step 52, default values for the target rectifier voltage (VTAR), step-size, upper limit, lower limit, and DAC setpoint are loaded and stored in memory locations (not shown) to initialize wireless charger receiver 14. At step 54, target rectifier voltage VTAR is updated, if necessary. Note that the target rectifier voltage VTAR is not necessarily the highest voltage that can be obtained, but is the voltage calculated to provide the most efficient power transfer. At step 56, rectifier voltage VRECT is measured, or sampled, using ADC 42. At decision step 58, it is determined if rectifier voltage VRECT is between an upper voltage limit and a lower voltage limit. If rectifier voltage VRECT is between the upper and lower limits, then the YES path is taken to step 60. At step 60, processing is delayed for a predetermined time period to minimize the power consumed by control circuit 18 and then steps 54, 56, and 58 are repeated. If at decision step 58, voltage VRECT is determined to be outside the upper and lower limits, then the NO path is taken to step 62. At step 62, an error voltage VERR is calculated to be a magnitude, or absolute value, of the difference between rectifier voltage VRECT and stored target rectifier voltage VTAR. Generally, for the most efficient power transfer, error voltage VERR should be small, or close to zero volts. At step 64, a digital input code representing a setpoint of DAC 46 is decremented by a step-size. If the setpoint is already zero, the setpoint is not reduced below zero. In one embodiment, the step-size is equal to one least significant bit (LSB). In other embodiments, the step-size may be different. Decrementing the DAC input code changes the output voltage provided by DAC 46. For example, in one embodiment, decrementing the digital input code of DAC 46 causes the output voltage VTUNE to be lower. In one embodiment, lowering voltage VTUNE causes the capacitance of variable capacitor 26 to be less. At step 66, processing of the method is delayed by a predetermined delay to minimize power consumption of control circuit 18. In one embodiment, the predetermined delay is 10 milliseconds (ms). At step 68, rectifier voltage VRECT is measured again. At step 70, error voltage VERR is updated by performing the calculation of step 62 with the value of VRECT measured at step 68. At decision step 72, it is determined if the value of error voltage VERR is less than when it was previously calculated at step 62. If VERR is less, then the YES path is taken to step 74. At step 74, the step-size is set to one LSB if it is not already at one LSB. Referring back to decision step 58, when it was determined that VRECT was not between the upper and lower limits, it was not known whether the resonant frequency of resonance network 16 should be adjusted higher or lower to approach target rectifier voltage VTAR. A guess has to be made about whether to increase or decrease the capacitance of variable capacitor 26. The step-size is one LSB because an improvement was made in error voltage VERR, indicating that the guess was correct. After step 74 and the predetermined delay of step 60, flow returns to step 54. If at decision step 72, it is determined that error voltage VERR is not less, then the guess was wrong and the variable capacitance was changed in the wrong direction. From step 72, the NO path is taken to step 76, the step-size is doubled to two LSBs to make up for the wrong correction made in step 64 and the DAC setpoint is incremented by the new step-size. After the predetermined delay at step 78, rectifier output voltage VRECT is measured again using ADC 42 at step 80. At step 82, error voltage VERR is updated using the current voltage for VRECT. The current rectifier voltage VRECT is measured at step 80 and error voltage VERR is calculated using the calculation of step 62. At decision step 84, it is determined if the latest calculated error voltage VERR is less than the previously calculated VERR. If yes, then the YES path is taken to step 90 where the step-size is set to one LSB if it is not already one LSB, and method 50 proceeds again at delay step 60. If the error voltage VERR is not less, then the NO path is taken to step 86. At step 86 DAC setpoint is decremented by the step-size. At step 88, the step-size is incremented by one LSB, and method 50 continues at step 60.

Method 50 automatically runs when a voltage is detected at antenna 15 and runs for as long as a charging voltage is being produced. The method and apparatus provide the advantage of improved charging efficiency for the current operating conditions. In the illustrated embodiment, rectifier voltage is measured as an indicator for efficient power transfer. In another embodiment, current, or some other factor, may be used as the indicator of efficient power transfer.

Figure 3:
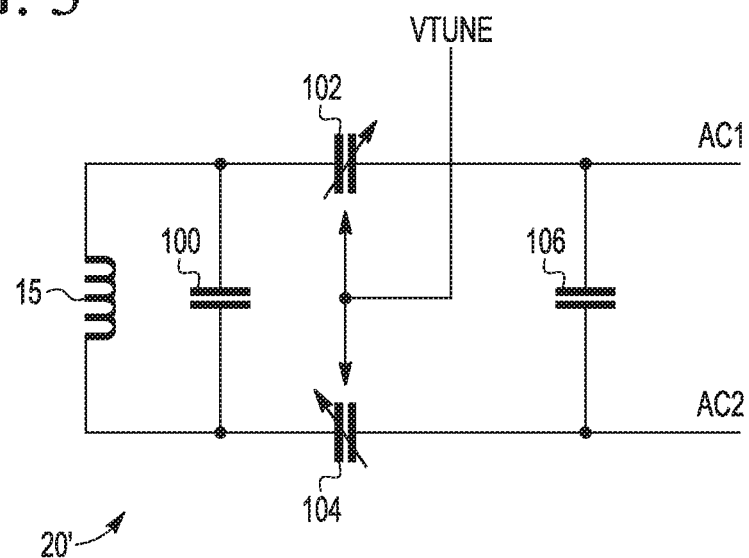
FIG. 3 illustrates, in schematic diagram form, another embodiment of the impedance matching circuit of FIG. 1.

FIG. 3 illustrates, in schematic diagram form, another embodiment 20' of the impedance matching circuit 20 of FIG. 1. In FIG. 3, antenna 15 is connected to impedance matching circuit 20'. Impedance matching circuit 20' includes capacitors 100, 102, 104, and 106 in the same circuit configuration as impedance matching circuit 20 in FIG. 1. Impedance matching circuit 20' is generally the same as impedance matching circuit 20 except that a variable impedance is provided by series capacitors 102 and 104. Variable capacitors 102 and 104 are adjusted using voltage VTUNE from DAC 46. As compared to impedance matching circuit 20, impedance matching circuit 20' allows variable capacitors to be used that have a lower voltage rating. The disadvantage is that the capacitors require a larger value and two are needed instead of just one.

Figure 4:
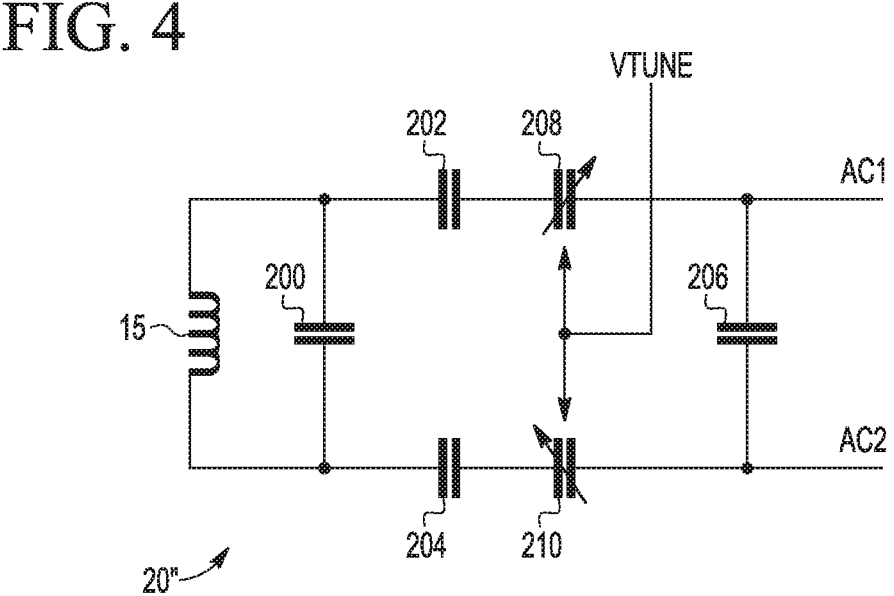
FIG. 4 illustrates, in schematic diagram form, another embodiment of the impedance matching circuit of FIG. 1.

FIG. 4 illustrates, in schematic diagram form, another embodiment 20" of the impedance matching circuit 20 of FIG. 1. In FIG. 4, antenna 15 is connected to impedance matching circuit 20". Impedance matching circuit 20" includes capacitors 200, 202, 204, 206, 208, and 210. Capacitors 208 and 210 are variable capacitors tunable using voltage VTUNE from DAC 46. Capacitors 202 and 208 may be a series impedance equivalent of capacitor 102 in FIG. 3 and Capacitors 204 and 210 may be a series impedance equivalent of capacitor 104 in FIG. 3. As compared to impedance matching circuit 20 in FIG. 1, impedance matching circuit 20" requires variable capacitors with a lower voltage rating. The disadvantage is that the capacitors require a larger value and two are needed instead of one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

Generally, the term "coupled," as used herein, is not intended to be limited to a direct coupling or a mechanical coupling. More specifically, the term "coupled" is not intended to be limited to magnetic resonance coupling, a direct coupling or an inductive coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for adjusting an antenna resonance impedance network of a wireless charging receiver during a wireless charging operation, the wireless charging receiver for being inductively coupled to a wireless charging transmitter, the method comprising:
    measuring an output voltage of a voltage rectifier, the voltage rectifier coupled to the antenna resonance impedance network; determining whether or not the output voltage is between upper and lower limits; if the output voltage is not between the upper and lower limits, determining an error voltage based on the output voltage and a target output voltage;
    changing a capacitance of a variable capacitive element in the antenna resonance impedance network by a first set amount;
        determining if there is an improvement in the error voltage;
changing the first set amount to a second set amount if the error voltage is reduced; and
    changing the capacitance of the variable capacitive element by the second set amount.

2. The method of claim 1, wherein changing the capacitance of the variable capacitive element further comprises changing a tuning voltage from a digital-to-analog converter to the variable capacitive element based on the error voltage.

3. The method of claim 1, wherein measuring the output voltage further comprises providing the output voltage to an analog-to-digital converter.

4. The method of claim 1, wherein if the output voltage is between the upper and lower limits, determining that an impedance of the antenna resonance impedance network is matched to an impedance of the wireless charging transmitter.

5. The method of claim 1, wherein determining the error voltage further comprises calculating a difference between the output voltage of the voltage rectifier and the target rectifier voltage.

6. The method of claim 5, further comprising adjusting a plurality of bits based on the error voltage, the plurality of bits for being provided to a digital-to-analog converter, the digital-to-analog converter coupled to the variable capacitive element.

7. The method of claim 1, wherein measuring the output voltage of the voltage rectifier further comprises measuring an output voltage of a MOSFET bridge rectifier.

8. The method of claim 1, wherein changing the capacitance of the variable capacitive element further comprises changing a tuning voltage from a digital-to-analog converter to the variable capacitive element using a host controller.

9. The method of claim 1, wherein determining the error voltage based on the output voltage and the target output voltage further comprises determining the error voltage based on a magnitude of a difference between the output voltage and the target output voltage.

10. In a wireless charging receiver having an antenna coupled to an input of a resonance network, the resonance network having an output coupled to a rectifier circuit, and the resonance network including an adjustable impedance element, a method comprising:
    storing a target rectifier voltage;
    measuring a first output voltage of rectifier circuit;
    determining if the first output voltage of the rectifier circuit is within an upper limit and a lower limit;
    if the first output voltage is not within the upper and lower limits, calculating a first error voltage as a difference between the first output voltage and the target rectifier voltage;
    changing the impedance of the adjustable impedance element by a first set amount;
    measuring a second output voltage of the rectifier circuit;
    calculating a second error voltage as a difference between the second output voltage and the target rectifier voltage;
    determining if the second error voltage is lower than the first error voltage;
    changing the first set amount to a second set amount based on determining if the second error voltage is lower than the first error voltage; and
    changing the impedance of the adjustable impedance element by the second set amount.

11. The method of claim 10, further comprising:
    updating the target rectifier voltage;
    measuring a third output voltage of the rectifier circuit; and
    determining if the third output voltage is between the upper and lower limits.

12. The method of claim 10, further comprising updating the target rectifier voltage using a host controller.

13. The method of claim 10, wherein calculating the first error voltage as a difference between the first output voltage and the target rectifier voltage further comprises calculating the first error voltage as a magnitude of the difference between the first output voltage and the target rectifier voltage.

14. The method of claim 10, wherein changing the impedance of the adjustable impedance element by a first set amount further comprises using a digital-to-analog converter to control the adjustable impedance element and wherein the first set amount comprises a least significant bit of a plurality of bits based on the first error voltage.

15. The method of claim 10, wherein measuring a first output voltage of rectifier circuit further comprises using an analog-to-digital converter to receive the first output voltage from the rectifier circuit.

16. A wireless charging receiver comprising:
an antenna;
a resonance network having an input coupled to the antenna, and an output, the resonance network having an impedance matching circuit comprising a variable impedance element;
a rectifier circuit having an input coupled to the output of the impedance matching circuit, and an output for providing a rectifier output voltage;
an analog-to-digital converter having an input coupled to receive the rectifier output voltage, and an output;
control logic having an input coupled to the output of the analog-to-digital converter, and an output, the control logic determining that the rectifier output voltage is outside predetermined upper and lower limits, and in response, changing a tuning voltage to the variable impedance by a first set amount, and in response to the control logic determining that the changed tuning voltage does not improve the rectifier output voltage, changing the tuning voltage to a second set amount different than the first set amount; and
a digital-to-analog converter having an input coupled to the output of the control logic, and an output coupled to provide the tuning voltage to the variable impedance element.

17. The wireless charging receiver of claim 16, wherein the variable impedance element is a variable capacitor.

18. The wireless charging receiver of claim 16, wherein the impedance matching circuit comprises:
a first capacitor having a first terminal coupled to a first terminal of the antenna, and a second terminal;
a second capacitor having a first terminal coupled to a second terminal of the antenna, and a second terminal;
a third capacitor having a first terminal coupled to the second terminal of the first capacitor, and a second terminal, and a second terminal coupled to the second terminal of the second capacitor; and
the variable impedance element has a first terminal coupled to the first terminal of the antenna, a second terminal coupled to the second terminal of the antenna, and a control terminal coupled to the output of the digital-to-analog converter.

19. The wireless charging receiver of claim 16, wherein the rectifier circuit is a MOSFET bridge rectifier.

20. The wireless charging receiver of claim 16, further comprising a host controller coupled to the control logic.

* * * * *